(12) United States Patent
Fischer

(10) Patent No.: US 8,794,657 B2
(45) Date of Patent: Aug. 5, 2014

(54) APPARATUSES AND METHODS FOR SECURING A VEHICLE

(76) Inventor: Billy Fischer, Hamshire, TX (US)

( * ) Notice: Subject to any disclaimer, the term of this patent is extended or adjusted under 35 U.S.C. 154(b) by 474 days.

(21) Appl. No.: 12/799,326

(22) Filed: Apr. 22, 2010

(65) Prior Publication Data

US 2011/0260429 A1   Oct. 27, 2011

(51) Int. Cl.
*B60D 1/04* (2006.01)

(52) U.S. Cl.
USPC ............................ 280/509; 172/275; 280/515

(58) Field of Classification Search
USPC ............... 280/508–510, 512, 514, 515, 434, 280/479.1, 461.1, 504; 172/272, 275, 439; 292/207
See application file for complete search history.

(56) References Cited

U.S. PATENT DOCUMENTS

| | | | | | |
|---|---|---|---|---|---|
| 318,323 | A | * | 5/1885 | Teetzel | 292/230 |
| 774,903 | A | * | 11/1904 | Ammann | 280/508 |
| 967,713 | A | * | 8/1910 | Blom | 280/508 |
| 1,592,832 | A | * | 7/1926 | La Londe | 280/434 |
| 2,491,143 | A | * | 12/1949 | Weiss | 280/504 |
| 2,783,059 | A | * | 2/1957 | Hartl | 280/509 |
| 3,535,679 | A | * | 10/1970 | Connors | 340/431 |
| 3,831,982 | A | | 8/1974 | Bernhardt et al. | |
| 3,856,331 | A | * | 12/1974 | Bogdanovich | 280/479.1 |
| 4,158,996 | A | * | 6/1979 | Marulic et al. | 105/310.1 |
| 4,699,395 | A | | 10/1987 | Hale | |
| 4,747,612 | A | * | 5/1988 | Kuhn | 172/275 |
| 4,778,196 | A | | 10/1988 | Spoliansky | |
| 5,147,096 | A | | 9/1992 | Rogers | |
| 5,161,815 | A | | 11/1992 | Penor, Jr. | |
| 6,000,710 | A | | 12/1999 | Schocker et al. | |
| 7,378,013 | B2 | * | 5/2008 | Sandler | 280/507 |
| 2010/0207360 | A1 | * | 8/2010 | Columbia | 280/504 |

* cited by examiner

*Primary Examiner* — Anne Marie M. Boehler

(57) ABSTRACT

Apparatuses and methods for engaging and/or securing a generally vertical member of a vehicle or other object are provided. The apparatus includes a second plate secured to a first plate and rotatably moveable with respect to the first plate. The first plate has a throat for accommodating the generally vertical member of the vehicle or other object, and a notch angularly displaced from the throat. The second plate has a first arm that extends across the throat to secure the generally vertical member within, and a second arm that moves into alignment with the notch, concurrent with movement of the second plate. When the second arm is aligned with the notch, a biased latch can be urged to engage the notch to secure the second plate in a generally fixed orientation relative to the first plate, thereby securing the vehicle or other object.

6 Claims, 2 Drawing Sheets

APPARATUSES AND METHODS FOR SECURING A VEHICLE

FIELD

The present disclosure relates, generally, to apparatuses and methods useable to secure a first object to a second object, and specifically, to secure a vehicle to a fixed object or to a second vehicle.

BACKGROUND

Conventional methods for attaching a first vehicle to a second include use of a tow hitch, or trailer hitch, which is attached to the chassis of a vehicle. Typical trailer hitches include fixed drawbars, which possess a hole for engaging the ball hitch of a trailer, or receiver hitches, which have an opening that accepts removable ball mounts, hitch bike racks, cargo carriers, or other hitch mounted accessories. Regardless of the specific type of hitch or engagement apparatus used, some manner of ball hitch or similar generally upright member is provided to a first vehicle, while a corresponding orifice, loop, hook, clasp, or enclosure is provided to the second vehicle. The large majority of such engagements require manual manipulation of parts to both engage and disengage a vehicle, increasing the time and tedium involved when securing the vehicle, and often requiring the assistance of one or more additional individuals outside of the vehicle.

Existing apparatuses that partially automate the engagement of a hitch, generally used within industrial settings, are typically bulky and complex structures, and often present possible difficulties and dangers when undertaking any remaining manual steps to complete an engagement or disengagement.

A need exists for apparatuses and methods for engaging a vehicle or another object that are automatic, and useable to engage a vehicle without exiting the vehicle or requiring the assistance of other individuals.

A need also exists for apparatuses and methods for engaging a vehicle or other object that are efficient and uncomplicated, requiring a minimum of moving parts and manual manipulation of such parts, suitable for personal and/or recreational use.

Embodiments of the present invention meet these needs.

BRIEF DESCRIPTION OF THE DRAWINGS

In the detailed description of various embodiments of the present invention presented below, reference is made to the accompanying drawings, in which.

DETAILED DESCRIPTION OF THE EMBODIMENTS

Figure 1:
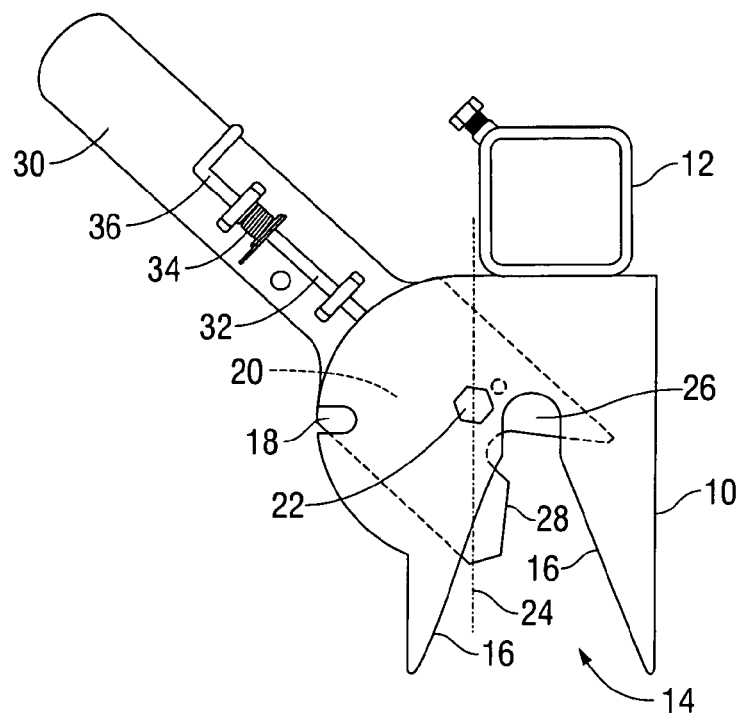
FIG. 1 depicts a top view of an embodiment of an apparatus useable within the scope of the present disclosure.

Before explaining selected embodiments of the present invention in detail, it is to be understood that the present invention is not limited to the particular embodiments described herein and that the present invention can be practiced or carried out in various ways.

The present disclosure relates, generally, to apparatuses and methods useable to engage and/or secure a generally vertical member of a vehicle, such as a trailer hitch or similar generally upright member, or another portion of a vehicle. Alternatively embodiments of the present invention are useable to engage other objects having one or more portions suitable for engagement.

In an embodiment of the invention, an apparatus is provided having a first plate secured in a generally fixed orientation with respect to the vehicle or other object to be secured. The first plate includes a throat for accommodating a hitch or other generally vertical member of the vehicle or object, and a notch perpendicular to or otherwise angularly displaced from the throat. While the throat can include any shape or dimensions, such as a V-shape or a U-shape, in an embodiment of the invention, the throat can include one or more angled and/or curved interior surfaces that can guide a generally vertical member of a vehicle into the throat through contact therewith.

A second plate is secured to the first plate, such as through use of a pin, bolt, screw, rivet, or similar connector extending through each of the plates, such that the second plate is rotatably moveable with respect to the first plate. In an embodiment of the invention, the throat can be laterally offset a selected distance from the engagement between the first and second plates to facilitate rotatable movement of the second plate into and from the throat. The second plate can include a first arm moveable into and from the throat, and a second arm moveable along the exterior of the first plate, such that when the second plate is disposed in a first position relative to the first plate, the first arm does not block or overlap the throat. When the second plate is rotated to a second position, the first arm is extended across the throat to enclose or otherwise entrap a hitch or other generally vertical member within.

Concurrent with extension of the first arm across the throat, the second arm of the second plate can be moved toward the notch within the first plate, such that when the second plate is disposed in the second position, the second arm is aligned with the notch. A biased latch, which can include a spring or any other type of biasing member, secured to the second arm, can then be biased to engage the notch, thereby securing the second plate in a generally fixed orientation relative to the first plate, and preventing disengagement of a vehicle or object from the apparatus until the latch is released. In an embodiment of the invention, the latch can include a handle or a similar member for accommodating manual release, however various hydraulic, pneumatic, electrical, and/or mechanical, members for automating disengagement of an object are also useable within the scope of the present disclosure.

In an embodiment of the invention, the second plate can include a protruding portion that overlaps and/or protrudes into the throat when the second plate is in the first position. Contact between a generally vertical member of a vehicle or other object can thereby impart a force to the second plate, causing rotation of the second plate toward the second position. In a further embodiment of the invention, the second arm can include an angled and/or curved interior surface oriented to cause rotation of the second plate toward the first position responsive to contact from the generally vertical member of the vehicle or other object. In this manner, engagement and disengagement of an object from the apparatus can be automated, requiring a minimum of manual manipulation of parts.

In use, the apparatus can be secured to a fixed object, a towing vehicle, the interior of a trailer, or another object with which it is desirable to engage a second object. For example, the apparatus can be secured to the interior of a trailer used to transport an all-terrain vehicle or similar recreational vehicle, for the purpose of securing the vehicle prior to transport. The all-terrain vehicle or similar object can then be driven toward the apparatus such that a hitch or similar generally vertical member enters the throat of the apparatus, and contacts a protruding portion of the second plate with sufficient force to cause rotation of the second plate relative to the first, without requiring any manual manipulation of the apparatus. When the second plate reaches the second position, the first arm encloses the hitch or other vertical member within the throat, while the biased latch is aligned with and automatically engages the notch within the first plate, thereby securing the vehicle or other object within the apparatus. When it is desired to disengage the apparatus, the latch can be released using a handle or other means, as described previously, and the engaged vehicle can simply be driven away from the apparatus, such that the hitch or other vertical member contacts the interior surface of the first arm, causing rotation of the second plate toward the first position to retract the first arm from the throat.

Figure 2:
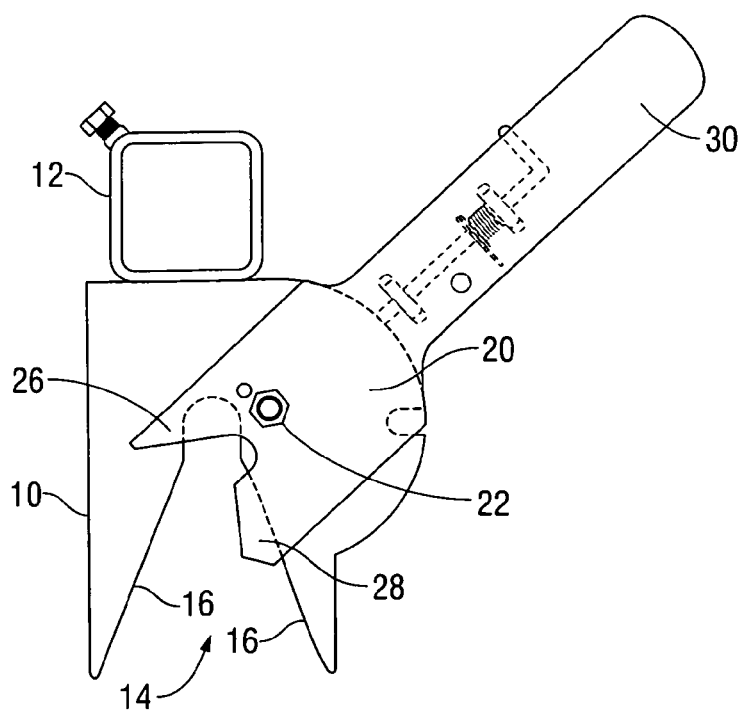
FIG. 2 depicts a bottom view of the apparatus of FIG. 1.

Referring now to FIG. 1 and FIG. 2, a top view and a bottom view, respectively, of an embodiment of an apparatus useable to engage a vehicle or other object is shown. Specifically, the apparatus is shown having a first plate (10) having a mounting bracket (12) welded or otherwise secured thereto, the mounting bracket (12) being useable to secure the apparatus to a vehicle and/or a fixed object. The first plate (10) is shown having a generally open throat (14), bounded at its lateral sides by two angled surfaces (16). A notch (18) is also shown formed within the first plate (10), generally perpendicular to the throat (14).

A second plate (20) is secured to the first plate (10) through use of a bolt or other connector (22), such that the second plate (20) is rotatably moveable relative to the first plate (10). The throat (14) is shown laterally displaced from the central axis (24) defined by the connection between the plates (10, 20), such that contact between portions of the second plate (20) and a vehicle or other object readily cause rotation of the second plate (20) relative to the first plate (10).

Specifically, FIG. 1 and FIG. 2 depict a protruding portion (26) of the second plate (20) that overlaps the throat (14) formed in the first plate (10), such that contact between the protruding portion (26) and a hitch or other generally vertical member of a vehicle or other object to be secured imparts a force to the second plate (20) to cause rotational movement of the second plate (20) relative to the first plate (10). As the second plate (20) rotates relative to the first plate (10), a first arm (28) of the second plate (20) extends into the throat (14) to block or otherwise secure a hitch or other vertical member within. Concurrently, a second arm (30) of the second plate (20) rotates about the exterior of the first plate (10) until a biased latch (32) disposed on the second arm (30) is aligned with the notch (18) within the first plate (10), which enables a spring or other biasing member (34) to bias the latch (32) into the notch (18), thereby securing the second plate (20) in a generally fixed orientation relative to the first plate (10). In an embodiment of the invention, the latch (32) can include a handle (36) or similar member to enable disengagement of the latch (32) from the notch (18), such that contact between a hitch or other vertical member and the interior of the second arm (28) can cause rotation of the second plate (20) such that the second arm (28) is withdrawn from the throat (14).

Figure 3:
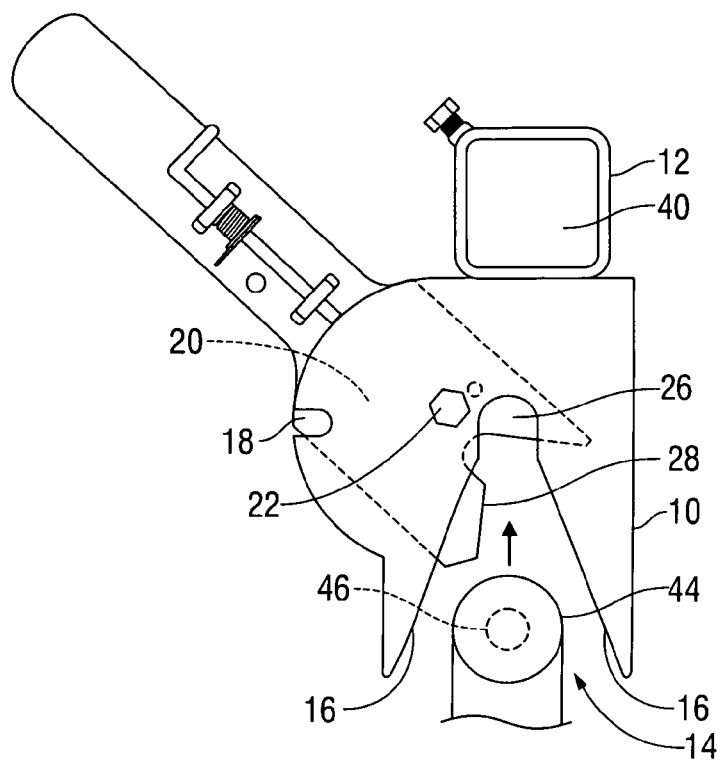
FIG. 3 depicts the apparatus of FIG. 1 in an open position, prior to engagement with a generally vertical member of a vehicle.

Referring now to FIG. 3, the apparatus depicted in FIGS. 1 and 2 is shown engaged to a fixed object (40) using the mounting bracket (12). While it is to be understood that embodiments of the apparatus can be engaged to any object, FIG. 3 depicts the fixed object (40) as a generally vertical post, such as that disposed at the exterior of a trailer used to transport recreational vehicles and/or other objects. A vehicle having a receiver hitch (42) disposed thereon is shown approaching the apparatus. A ball hitch attachment (44) is secured within the receiver hitch (42), the depicted ball hitch attachment (44) having a vertical member (46) beneath a ball hitch. It should be noted that the depicted vertical member (46) is disposed beneath not only the ball portion of the ball hitch attachment (44), but beneath the entirety of the ball hitch attachment (44), such that the apparatus engages a portion of the ball hitch attachment (44) independent of and remote from the ball and adjacent member that connects the ball to the remainder of the ball hitch attachment (44). The apparatus is secured along the fixed object (40) at a height generally level with that of the vertical member (46), such that the vertical member (46) can be engaged within the throat (14). Engagement with the vertical member (46) of the ball hitch attachment (44) can provide a more reliable and secure engagement than conventional loops, fasteners, and/or other devices that engage the ball of the ball hitch attachment (44). While FIG. 3 depicts a ball hitch attachment (44) secured to a vehicle, it should be understood that the depicted apparatus is useable to engage any member able to pass within the throat (14), As the vehicle is driven toward the apparatus in an orientation such that the ball hitch attachment (44) approaches the apparatus, the vertical member (46) enters the throat (14). Continued movement of the vertical member (46) into the throat (14) can cause the vertical member (46) to contact the protruding portion (26) of the second plate (20), imparting a rotational force to the second plate that causes movement of the second plate relative to the first plate (10). Rotation of the second plate extends the first arm (28) across the throat (14), thereby enclosing the vertical member (46) of the ball hitch attachment (44) therein. Concurrently, the second arm (30) of the second plate can move into alignment with the notch (18) within the first plate (10), such that the biased latch (32) securely engages the second plate to the first plate (10), preventing disengagement of the vertical member (46).

Figure 4:
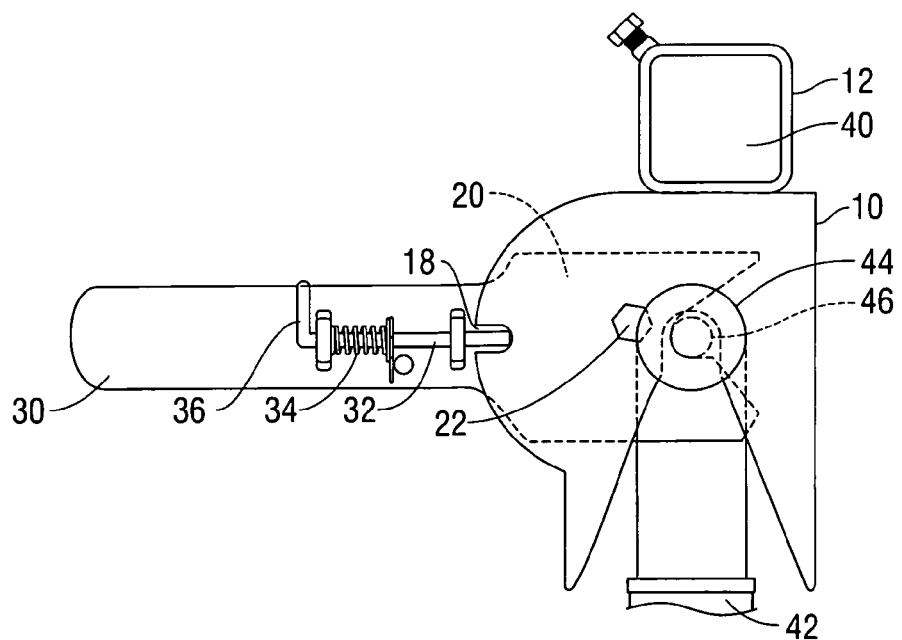
FIG. 4 depicts the apparatus of FIG. 3 in a closed position, after engagement with the generally vertical member of the vehicle Embodiments of the present invention are described below with reference to the listed Figures.

FIG. 4 depicts the apparatus of FIG. 3 after the vertical member (46) of the ball hitch attachment (44) has been engaged. As described previously, the apparatus is shown engaged with the fixed object (40) using the mounting bracket (12), which is shown including a bolt for facilitating engagement and disengagement of the apparatus. The ball hitch attachment (44) is shown above the throat (14), such that the vertical member (46) is engaged therein. The second arm (28, shown in FIG. 3) extends across the throat (14) to secure the vertical member (46), while the second arm (30) has moved along the exterior of the first plate (10), such that the biased latch (32) is aligned with the notch (18). Once the biased latch (32) is aligned with the notch, the biasing member (34) urges the latch (32) to extend into the notch, thereby securing the second plate (20) in a fixed orientation relative to the first plate (10). The depicted vehicle is thereby secured in a generally fixed position relative to the fixed object (40). When it is desirable to disengage the vehicle from the fixed object (40), the handle (36) of the biased latch (32) can be manipulated to remove the latch (32) from the notch, and the vehicle can be driven away from the apparatus, such that the vertical member (46) of the ball hitch attachment (44) contacts the interior surface of the second arm. This contact imparts a rotational force to the second plate (20), which causes rotation of the second plate (20) relative to the first plate (10) and removal of the second arm from the throat (14), thereby enabling removal of the vertical member (46) therefrom.

Embodiments of the present invention thereby provide apparatuses and methods that enable automatic engagement of a vehicle or other object, suitable for personal and/or recreational use, which require a minimum of moving parts and manual manipulation of said parts.

While various embodiments of the present invention have been described with emphasis, it should be understood that within the scope of the appended claims, the present invention might be practiced other than as specifically described herein.

What is claimed is:

1. An apparatus for engaging a generally vertical member of a vehicle, the apparatus comprising:
   a first plate secured in a generally fixed orientation with respect to the vehicle, wherein the first plate comprises a throat for accommodating the generally vertical member of the vehicle, a notch angularly displaced from the throat, and a contact surface angularly displaced from the notch, and wherein the notch and the contact surface are located on a perimeter of the first plate;
   a second plate rotatably moveable with respect to the first plate between a first position and a second position, wherein the second plate comprises a first arm and a second arm, wherein the second arm is in substantial alignment with the contact surface when the second plate is in the first position, and wherein the first arm extends across the throat and the second arm is in substantial alignment with the notch when the second plate is in the second position; and
   a biased latch having a longitudinal axis and secured to the second arm, wherein the biased latch is moveable between an engaged position and a disengaged position, wherein the biased latch is urged in a direction parallel to the longitudinal axis toward the engaged position, wherein the contact surface retains the biased latch in the disengaged position when the second arm is in substantial alignment with the contact surface, and wherein the biased latch engages the notch when the second arm is in substantial alignment with the notch, thereby securing the second plate in a generally fixed orientation relative to the first plate for enclosing the generally vertical member within the throat.

2. The apparatus of claim 1, further comprising a connector extending through the first plate and the second plate, wherein the connector secures the second plate to the first plate and permits rotatable movement of the second plate relative to the first plate, and wherein the throat is offset a selected lateral distance from the connector to facilitate rotatable movement of the second plate relative to the first plate.

3. The apparatus of claim 1, wherein the throat comprises at least one angled interior surface for guiding the generally vertical member of the vehicle into the throat.

4. The apparatus of claim 1, wherein the notch is disposed on an exterior of the first plate generally perpendicular to the throat.

5. The apparatus of claim 1, wherein the second plate further comprises a protruding portion that protrudes into the throat when the second plate is in the first position for enabling contact with the protruding portion to cause the second plate to rotate relative to the first plate.

6. The apparatus of claim 1, wherein the second arm comprises an interior angled surface adapted to enable contact between the generally vertical member and the interior angled surface to cause rotation of the second plate relative to the first plate.

* * * * *